United States Patent
Yokoyama

(10) Patent No.: US 10,883,556 B2
(45) Date of Patent: Jan. 5, 2021

(54) DISC BRAKE

(71) Applicant: TOYOTA JIDOSHA KABUSHIKI KAISHA, Toyota (JP)

(72) Inventor: Tomohiro Yokoyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/434,774

(22) Filed: Jun. 7, 2019

(65) Prior Publication Data
US 2020/0011386 A1 Jan. 9, 2020

(30) Foreign Application Priority Data

Jul. 6, 2018 (JP) ................................ 2018-128877

(51) Int. Cl.
*F16D 55/226* (2006.01)
*F16D 65/092* (2006.01)

(52) U.S. Cl.
CPC ......... *F16D 55/226* (2013.01); *F16D 65/092* (2013.01)

(58) Field of Classification Search
CPC ...... F16D 55/225; F16D 55/226; F16D 55/26; F16D 55/2262; F16D 55/2265; F16D 65/0971; F16D 65/095
USPC ............................ 188/71.1, 72.4, 73.1, 73.43
See application file for complete search history.

(56) References Cited

U.S. PATENT DOCUMENTS 3,207,268 A * 9/1965 Mossey ................. F16D 55/226
188/72.5
3,245,500 A * 4/1966 Hambling ........... F16D 55/2262
188/72.6
3,402,790 A * 9/1968 Rath ..................... F16D 65/092
188/72.5
3,421,602 A * 1/1969 Craske ................ F16D 55/2262
188/73.43
3,421,603 A * 1/1969 Hoenick ................. F16D 65/18
188/72.4
3,428,152 A * 2/1969 Hoenick ............. F16D 55/2262
188/72.5
3,493,084 A * 2/1970 Maurice ............. F16D 55/2262
188/72.5
3,543,887 A * 12/1970 Hodkinson ......... F16D 55/2262
188/73.43

(Continued)

FOREIGN PATENT DOCUMENTS

| JP | 55-175641 U1 | 12/1980 |
| JP | 08-296672 A | 11/1996 |
| JP | 09-100849 A | 4/1997 |

*Primary Examiner* — Thomas W Irvin
(74) *Attorney, Agent, or Firm* — Sughrue Mion, PLLC

(57) ABSTRACT

A disc brake of a floating type includes: an inner pad and an outer pad located on opposite sides of a rotor; a pressing device that presses the inner pad and the outer pad against the rotor; and a housing holding the pressing device. The pressing device includes: a first pressing member movable toward the rotor; a second pressing member movable away from the rotor; and a frame held by the housing via engageable portions movably relative to the housing in a direction parallel with a rotation axis of the rotor. The engageable portions are spaced apart from each other in a circumferential direction of the rotor. The frame is moved with movement of the second pressing member to press the outer pad against the rotor. Each of the engageable portions has a labyrinth structure.

5 Claims, 8 Drawing Sheets

(56) References Cited

U.S. PATENT DOCUMENTS

| | | | | |
|---|---|---|---|---|
| 3,656,589 | A | * | 4/1972 | Kawabe ................ F16D 55/226 |
| | | | | 188/72.5 |
| 3,692,151 | A | * | 9/1972 | Kobayashi .......... F16D 55/2262 |
| | | | | 188/72.5 |
| 3,719,257 | A | * | 3/1973 | Maurice .............. F16D 65/0978 |
| | | | | 188/73.39 |
| 3,912,051 | A | * | 10/1975 | Yokoi ................. F16D 55/2262 |
| | | | | 188/72.5 |
| 3,933,226 | A | * | 1/1976 | Maurice ............... F16D 55/226 |
| | | | | 188/72.5 |
| 6,695,099 | B1 | * | 2/2004 | Waag ................... F16D 55/228 |
| | | | | 188/70 R |
| 2019/0176781 | A1 | * | 6/2019 | Yokoyama ............. B60T 1/065 |
| 2019/0178320 | A1 | * | 6/2019 | Yokoyama ............. F16D 65/72 |
| 2020/0011387 | A1 | * | 1/2020 | Yokoyama .......... F16D 55/2262 |
| 2020/0109751 | A1 | * | 4/2020 | Yokoyama .......... F16D 65/0056 |
| 2020/0191210 | A1 | * | 6/2020 | Yokoyama ............ F16D 55/226 |

\* cited by examiner

DISC BRAKE

CROSS REFERENCE TO RELATED APPLICATION

The present application claims priority from Japanese Patent Application No. 2018-128877, which was filed on Jul. 6, 2018, the disclosure of which is herein incorporated by reference in its entirety.

BACKGROUND

The following disclosure relates to a disc brake mounted on a wheel of a vehicle.

Patent Document 1 (Japanese Unexamined Utility Model (Registration) Application Publication No. 55-175641) discloses a disc brake including: an inner pad and an outer pad respectively located on opposite sides of a rotor rotatable with a wheel; and a pressing device configured to press the inner pad and the outer pad against the rotor and including a wheel cylinder and a frame as a caliper movable in a direction parallel with the rotation axis of the rotor. In this disc brake, the wheel cylinder includes: an immovable cylinder body; and a first piston and a second piston slidably held by the cylinder body. When a hydraulic pressure is supplied to the wheel cylinder, the first piston presses the inner pad against the rotor, the second piston moves the frame, and the frame presses the outer pad against the rotor. As a result, the disc brake is operated. It is noted that lines 13-20 on page 4 in Patent Document 1 describe "the caliper 2, . . . , has a ring shape in plan view, and a right end portion of the caliper 2, not illustrated, is engaged with a piston like the caliper illustrated in FIG. 1 or fixed to the cylinder and supported on and guided by a fixing member, not illustrated, such that the caliper 2 is slidable with the cylinder in a direction perpendicular to the braking disc 10".

SUMMARY

Accordingly, an aspect of the disclosure relates to improvement of a disc brake including a pressing device having a frame and to a technique of making it difficult for foreign matters to enter into an engageable portion between the frame and a housing.

In a disc brake according to one aspect of the disclosure, a frame is held by a housing mounted on a non-rotating member, such that the frame is movable relative to the housing in a direction parallel with a rotation axis of a rotor via at least one pair of engageable portions spaced apart from each other in a circumferential direction. Each of the at least one pair of engageable portions has a labyrinth structure. This configuration makes it difficult for foreign matters to enter into a main portion of the engageable portion, enabling stable movement of the frame relative to the housing, for example. It is noted that Patent Document 1 does not disclose that the frame is held by the cylinder body so as to be movable relative to the cylinder body in the direction parallel with the rotation axis of the rotor via a pair of the engageable portions spaced apart from each other in the circumferential direction and does not disclose that the engageable portion between the frame and the housing has a labyrinth structure.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

Hereinafter, there will be described a disc brake provided for a wheel of a vehicle according to one embodiment by reference to the drawings.

Figure 1:
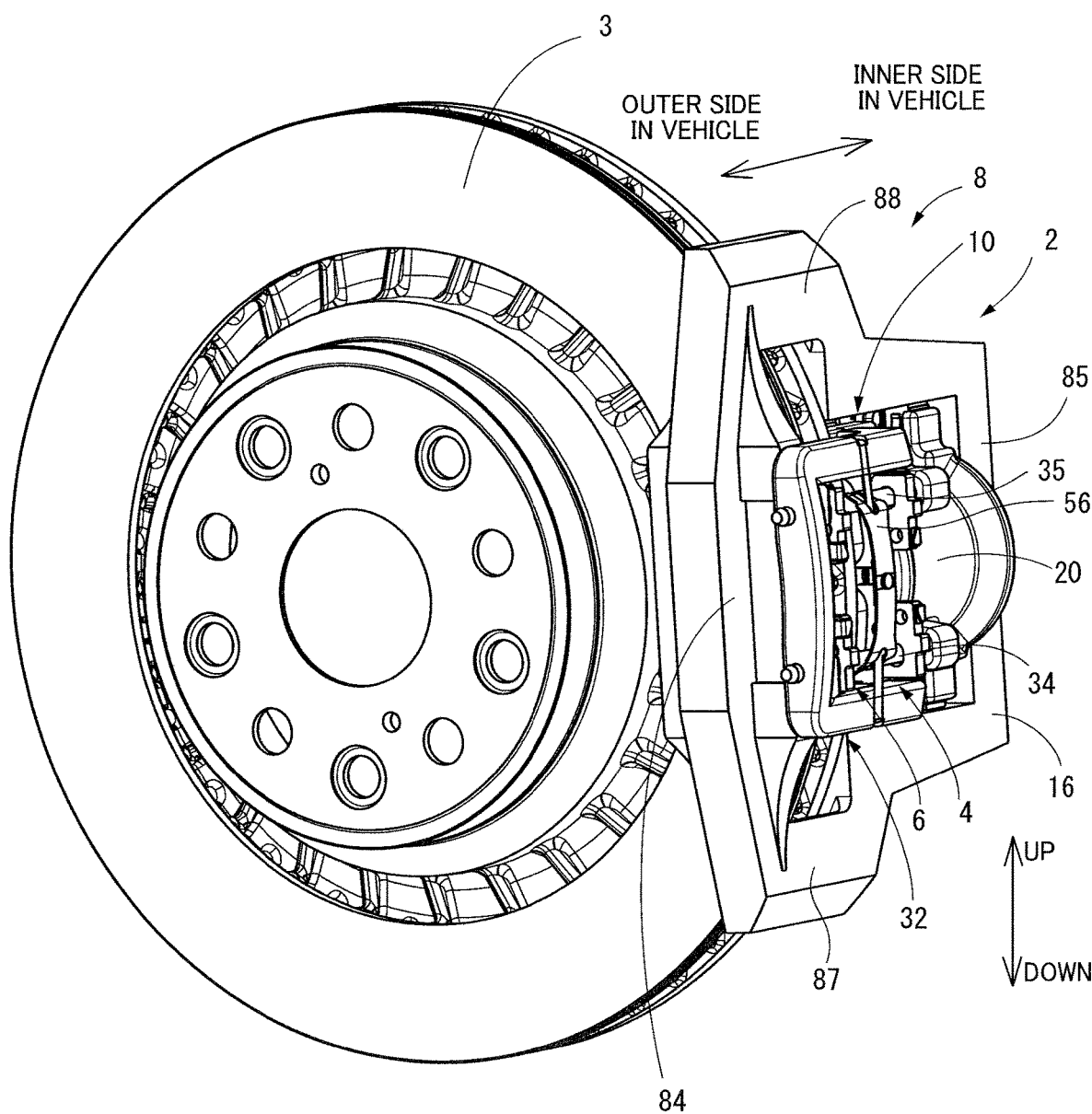
FIG. 1 is a perspective view of a disc brake according to a first embodiment.
Figure 3:
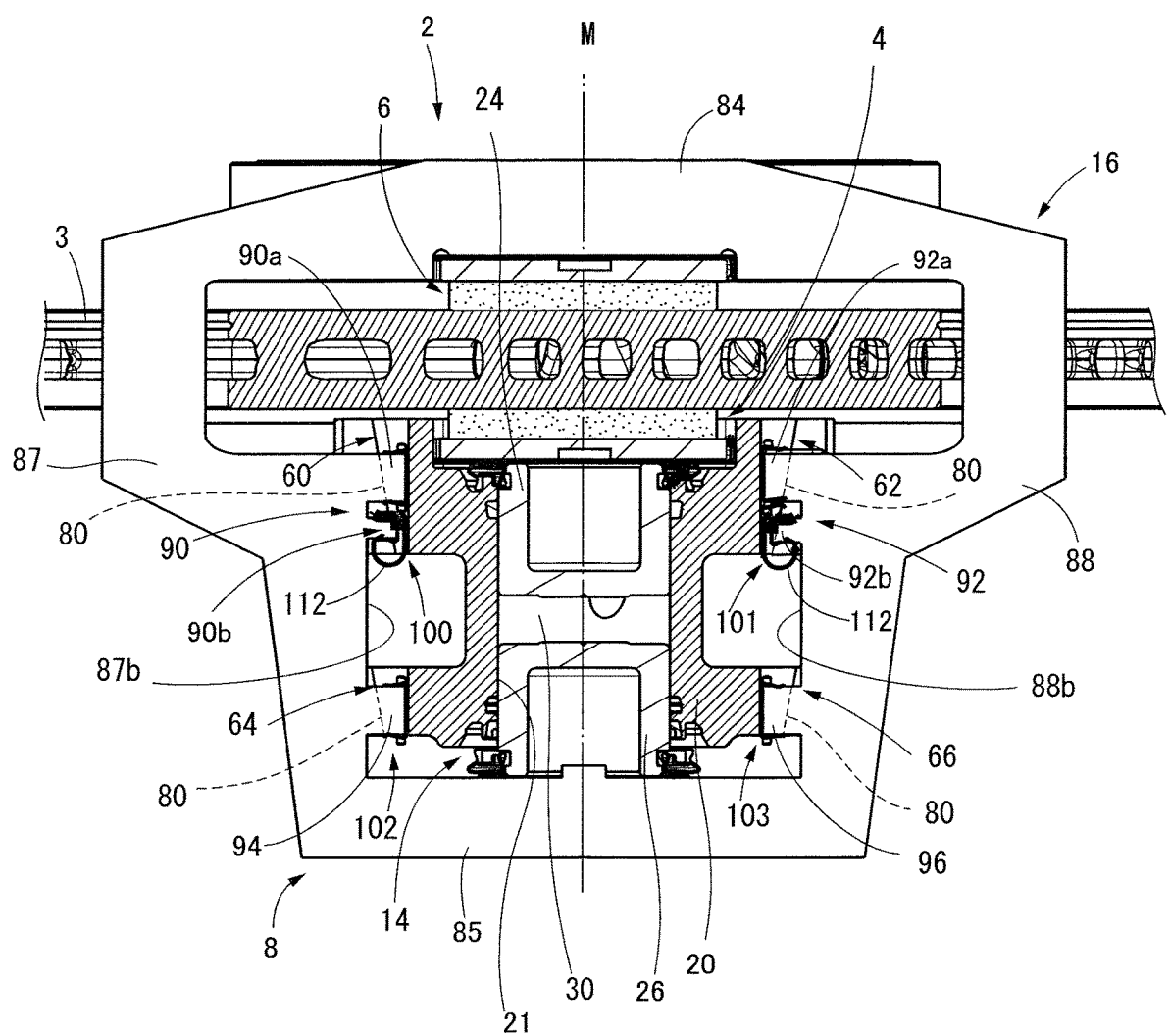
FIG. 3 is a cross-sectional view of a pressing device of a disc brake.
Figure 4:
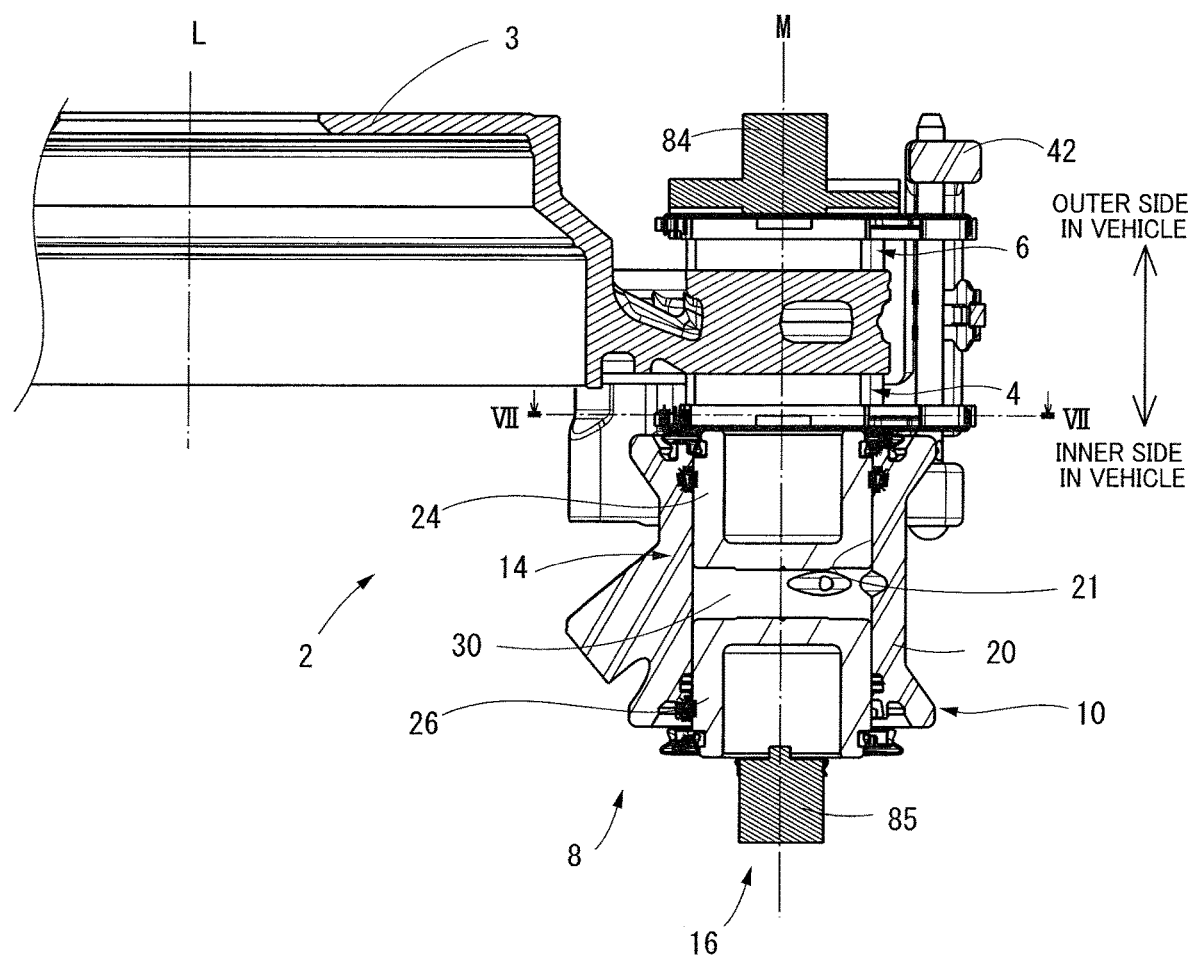
FIG. 4 is a cross-sectional view of a portion of the disc brake.

A disc brake 2 according to the present embodiment is a floating disc brake operable by a hydraulic pressure. As illustrated in FIG. 1, the disc brake 2 is mounted at a position opposed to a front portion or a rear portion of a rotor 3. As illustrated in FIG. 1-4, the disc brake 2 includes: an inner pad 4 and an outer pad 6 located on opposite sides of the rotor 3 that is rotated together with the wheel; a pressing device 8; and a housing 10 holding the pressing device 8. The pressing device 8 includes a wheel cylinder 14 and a frame 16. It is noted that, as illustrated in FIG. 4, the rotation axis L of the rotor 3 and the axis M of the pressing device 8 are parallel with each other. Thus, each of the direction parallel with the rotation axis L of the rotor 3 and the direction parallel with the axis M of the pressing device 8 may be hereinafter referred to simply as "axial direction". As illustrated in FIGS. 1 and 4, a side on which the outer pad 6 is located in the axial direction is an outer side in the vehicle, and a side on which the inner pad 4 is located in the axial direction is an inner side in the vehicle. The outer side in the vehicle and the inner side in the vehicle may be hereinafter referred to simply as "outer side" and "inner side", respectively.

As illustrated in FIGS. 2-6, the housing 10 includes: a main housing portion 20 located on an inner side of the rotor 3; a bridge portion 32 extending from the main housing portion 20 toward the outer side over the rotor 3; and a pair of pad pins 34, 35 spaced apart from each other in the circumferential direction of the rotor 3. The main housing portion 20 extends substantially in the axial direction. A cylinder bore 21 is formed through the main housing portion 20 in the axial direction. A first piston 24 as one example of a first pressing member and a second piston 26 as one example of a second pressing member are fluid-tightly and slidably fitted in the cylinder bore 21. A hydraulic-pressure chamber 30 is formed in the cylinder bore 21 at a position between the first piston 24 and the second piston 26. Each of the first piston 24 and the second piston 26 has a hollow cylindrical shape having a closed bottom. The first piston 24 and the second piston 26 are concentrically arranged in line in the axial direction in a state in which bottom portions of the first piston 24 and the second piston 26 are opposed to the hydraulic-pressure chamber 30. In the present embodiment, the main housing portion 20 or a portion of the main housing portion 20 at which the cylinder bore 21 is formed serves as a cylinder body of the wheel cylinder 14, and the wheel cylinder 14 is constituted by the cylinder body, the first piston 24, the second piston 26, and so on. Thus, it is possible to consider that the wheel cylinder 14 is held by the housing 10.

A pair of mount portions 36, 37 are provided on opposite sides, in a direction orthogonal to the axis M, of a rotor-side end portion of the main housing portion 20 in the axial direction. Each of the mount portions 36, 37 extends toward the inner side of the rotor 3 in the radial direction and is secured to a corresponding one of suspension members (which may be also referred to as "vehicle-body-side component") such as a knuckle as one example of a non-rotating member.

Figure 2:
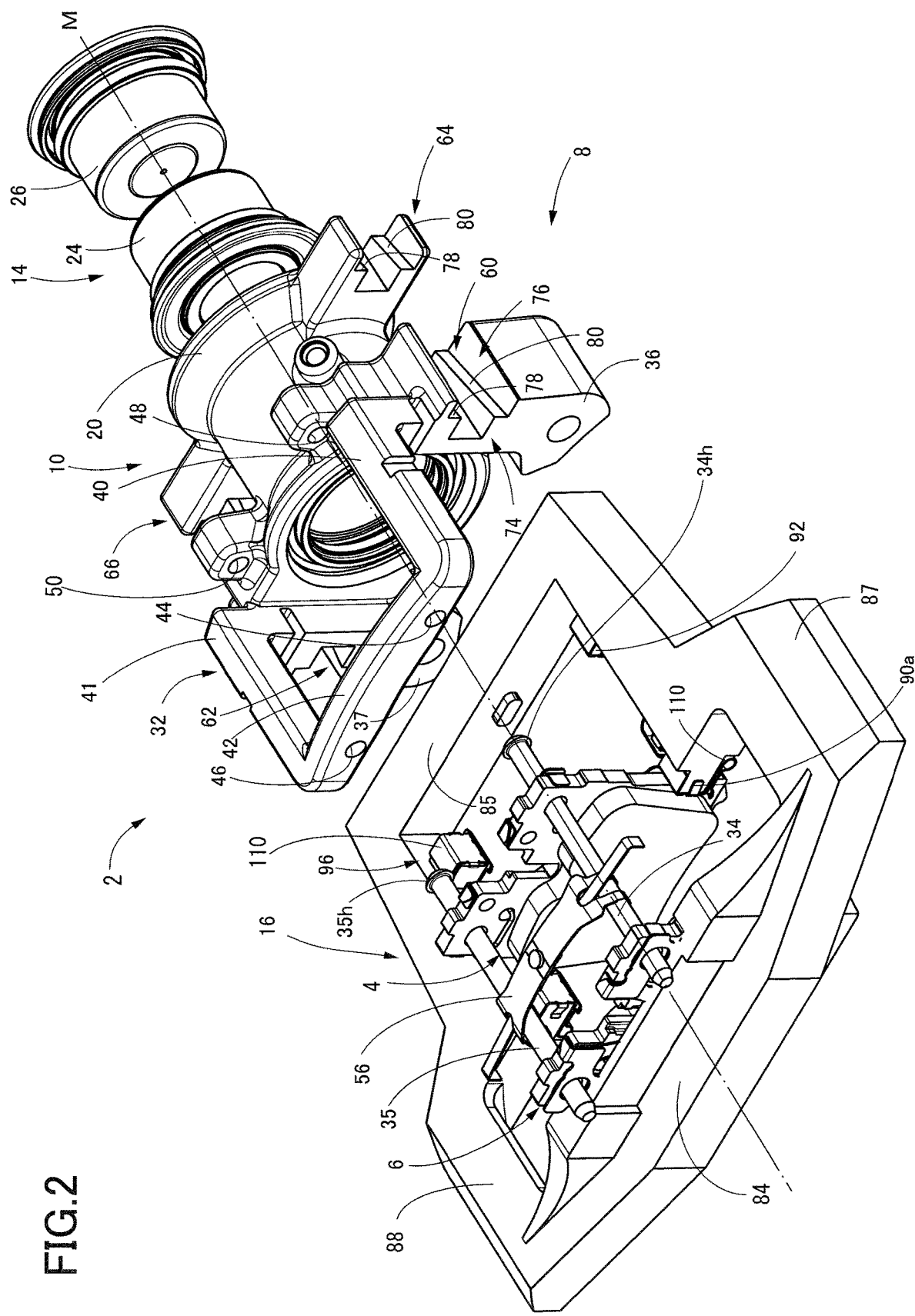
FIG. 2 is an exploded perspective view of a main portion of the disc brake.
Figure 5:
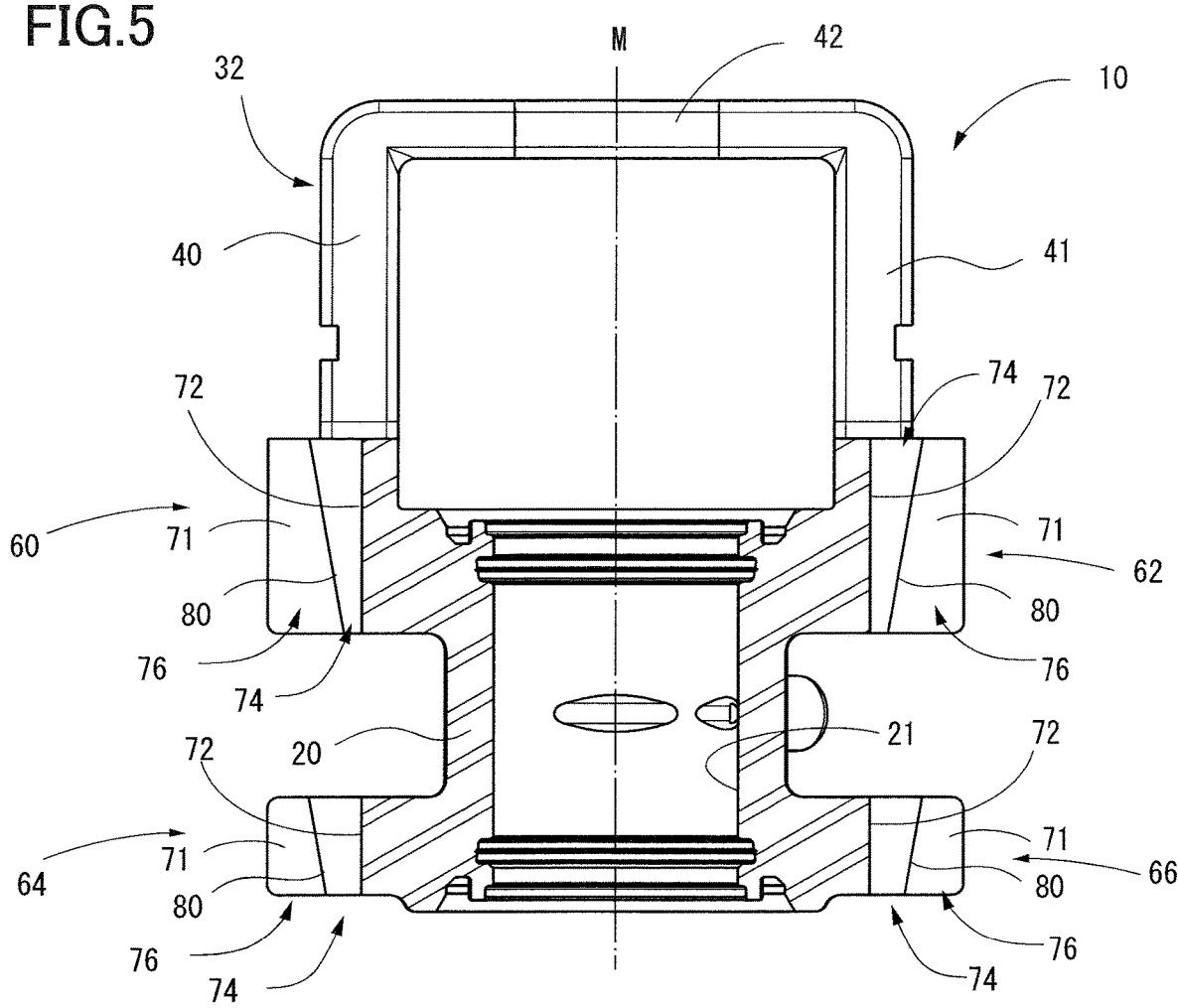
FIG. 5 is a cross-sectional view taken along line V-V in FIG. 6.

As illustrated in FIGS. 2 and 5, the bridge portion 32 has a three-sided rectangular shape in plan view. The bridge portion 32 includes: a pair of rods 40, 41 spaced apart from each other in the circumferential direction and each extending in the axial direction; and a coupler 42 coupling the rods 40, 41 to each other. The coupler 42 has two through holes 44, 46 spaced apart from each other in the circumferential direction. Through holes 48, 50 are respectively formed in portions of the main housing portion 20 which correspond to the respective through holes 44, 46. The pad pin 34 is fit in the through holes 44, 48, and the pad pin 35 is fit in the through holes 46, 50 in a state in which the pad pins 34, 35 extend in the axial direction. The pad pin 34 extends through the through hole 48, the inner pad 4, the outer pad 6, and the through hole 44 in this order, and the pad pin 35 extends through the through hole 50, the inner pad 4, the outer pad 6, and the through hole 46 in a state in which heads 34h, 35h of the respective pad pins 34, 35 are located on the inner side of the other ends of the respective pad pins 34, 35. It is noted that split pins, not illustrated, are attached to outer-side end portions of the respective pad pins 34, 35 to prevent removal of the respective pad pins 34, 35.

The inner pad 4 and the outer pad 6 are thus held by the pad pins 34, 35 so as to be movable in the axial direction. Since the two pad pins 34, 35 are spaced apart from each other in the circumferential direction, pivotal movement of the inner pad 4 and the outer pad 6 about each of the pad pins 34, 35 is prevented. A leaf spring in the form of a pad spring 56 is attached to intermediate portions of the respective pad pins 34, 35. The pad spring 56 applies an elastic force to the pad pins 34, 35 in directions in which the pad pins 34, 35 are moved toward each other. This pad spring 56 reduces looseness of the inner pad 4 and the outer pad 6, resulting in reduced vibrations and abnormal sounds.

Two pairs of engageable recessed portions engageable with the frame 16 are provided on the main housing portion 20 so as to be spaced apart from each other in the axial direction. As illustrated in FIGS. 2, 3, and 5, the two pairs of engageable recessed portions include a pair of first engageable recessed portions 60, 62 and a pair of second engageable recessed portions 64, 66. The first engageable recessed portions 60, 62 are provided at base portions of the respective mount portions 36, 37 provided on the rotor-side end portion of the main housing portion 20. The second engageable recessed portions 64, 66 are provided at an end portion of the main housing portion 20 which is far from the rotor 3. The first engageable recessed portions 60, 62 are spaced apart from each other in the circumferential direction. The second engageable recessed portions 64, 66 are spaced apart from each other in the circumferential direction. In the present embodiment, the first engageable recessed portion 60 and the first engageable recessed portion 62 are symmetric with respect to the axis M, and the second engageable recessed portion 64 and the second engageable recessed portion 66 are symmetric with respect to the axis M. That is, the first and second engageable recessed portions 60, 64 and the first and second engageable recessed portions 62, 66 are symmetric in shape with respect to the axis M and are provided on the main housing portion 20 respectively at positions that are symmetric with respect to the axis M.

Figure 6:
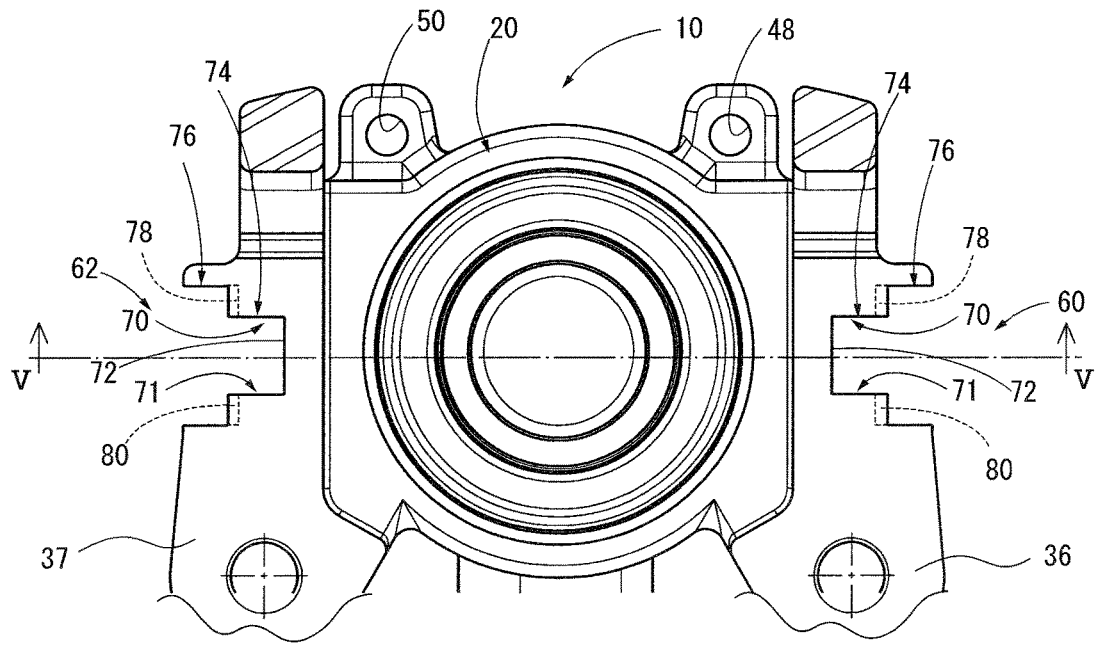
FIG. 6 is a rear view of a housing of the disc brake.

Each of the first engageable recessed portions 60, 62 and the second engageable recessed portions 64, 66 may be a stepped grooved portion extending in the axial direction and recessed in the circumferential direction. As illustrated in FIGS. 5 and 6, each of the first engageable recessed portions 60, 62 and the second engageable recessed portions 64, 66 includes: a pair of wall surfaces 70, 71 opposed to each other in the radial direction; a bottom surface 72 located between the wall surfaces 70, 71; a narrow portion 74 at which the distance between the wall surfaces 70, 71 is small; and a wide portion 76 at which the distance between the wall surfaces 70, 71 is large. The pair of wall surfaces 70, 71 and the bottom surface 72 extend parallel with the axial direction. Each of surfaces 78, 80 of the respective steps formed between the narrow portion 74 and the wide portion 76 is inclined so as to be closer to the bottom surface 72 at a portion of each of the surfaces 78, 80 which is far from the inner pad 4 and the rotor 3 in the axial direction than at a portion of each of the surfaces 78, 80 which is close to the inner pad 4 and the rotor 3 in the axial direction.

As illustrated in FIGS. 1, 2, and 3, the frame 16 is a rigid member having a substantially frame shape and held by the main housing portion 20 so as to be movable relative to each other in the axial direction. The frame 16 includes: a first side portion 84 and a second side portion 85 extending in the direction orthogonal to the axis M and spaced apart from each other in the axial direction; and a third side portion 87 and a fourth side portion 88 extending in the direction intersecting the first side portion 84 and the second side portion 85 and spaced apart from each other in the circumferential direction. The third side portion 87 and the fourth side portion 88 couple the first side portion 84 and the second side portion 85 to each other. The first side portion 84 and the second side portion 85 are located on opposite sides of the rotor 3 in the axial direction. The first side portion 84 is located on an outer side of the rotor 3 and engaged with the outer pad 6 so as to be movable together with the outer pad 6 in the axial direction. The second side portion 85 is located on an inner side of the rotor 3 and opposed to the second piston 26.

Each of the third side portion 87 and the fourth side portion 88 extends toward the outer and inner sides of the rotor 3. Specifically, as illustrated in FIGS. 1 and 3, each of the third side portion 87 and the fourth side portion 88 extends over the rotor 3 without extending over the outer side of the inner pad 4 and the outer pad 6 in the radial direction.

Two pairs of engageable protrusions are provided on inner surfaces of the third side portion 87 and the fourth side portion 88 which face each other. The two pairs of engageable protrusions are spaced apart from each other in the axial direction. The two pairs of engageable protrusions include a pair of first engageable protrusions 90, 92 and a pair of second engageable protrusions 94, 96 that are farther from the rotor 3 than the pair of first engageable protrusions 90, 92. Each of the first engageable protrusions 90, 92 includes two protrusions spaced apart from each other in the axial direction. That is, the first engageable protrusions 90 include protrusions 90a, 90b, and the first engageable protrusions 92 include protrusions 92a, 92b. Each of the first engageable protrusions 90 (90a, 90b), 92 (92a, 92b) and the second engageable protrusions 94, 96 protrudes in the circumferential direction. In the present embodiment, the first engageable protrusions 90 and the second engageable protrusion 94, and the first engageable protrusions 92 and the second engageable protrusion 96 are symmetric with respect to the axis M. That is, the first engageable protrusions 90 and the second engageable protrusion 94, and the first engageable protrusions 92 and the second engageable protrusion 96 are symmetric in shape with respect to the axis M and are provided on the frame 16 at positions that are symmetric with respect to the axis M.

Figure 7:
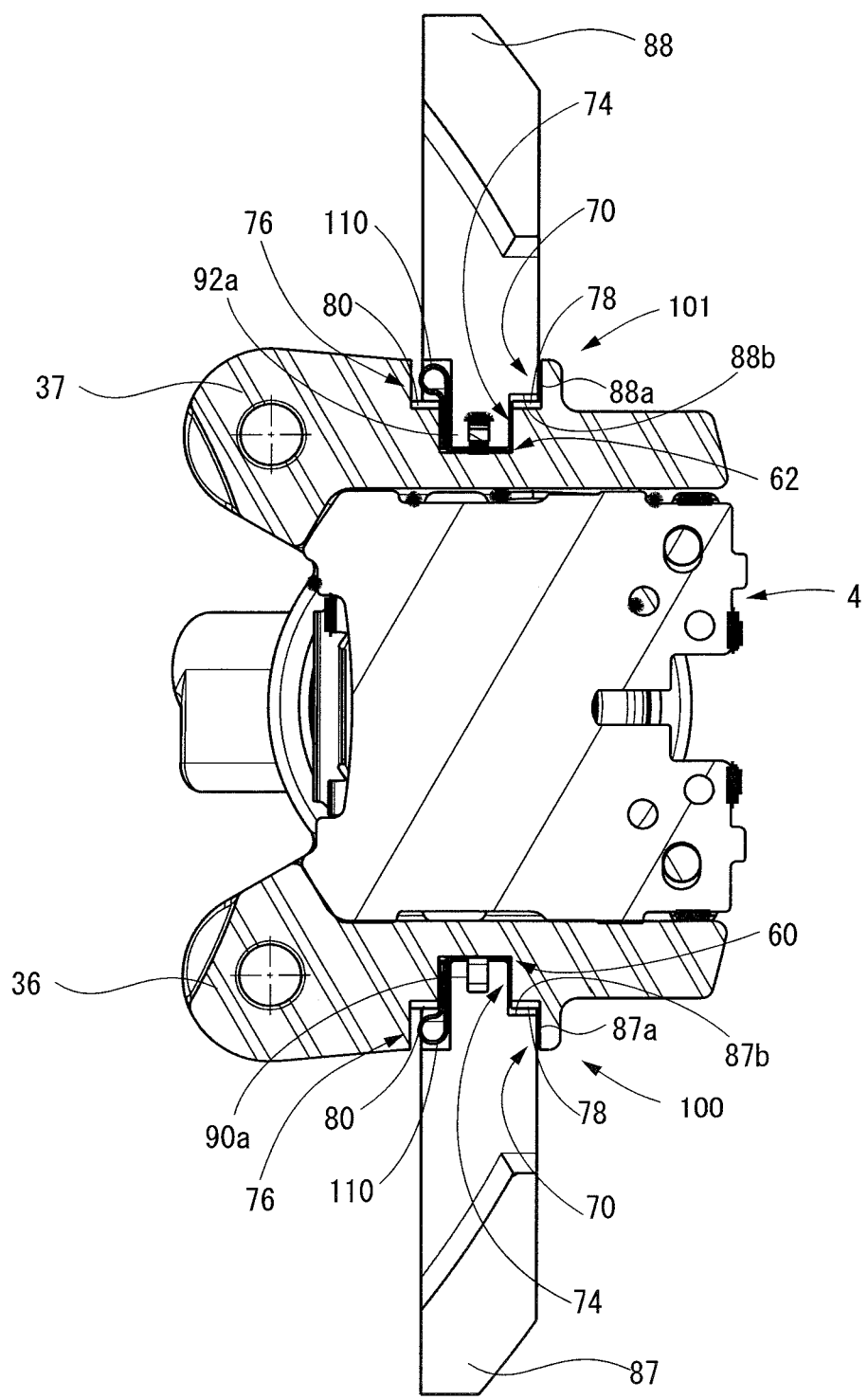
FIG. 7 is a cross-sectional view taken along line in FIG. 4.
Figure 8:
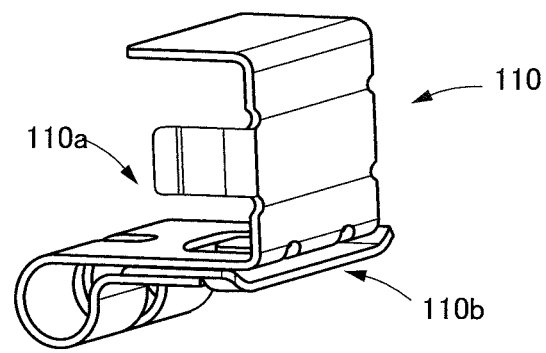
FIG. 8 is a perspective view of a radial spring mounted on an engageable protrusion of a frame of the disc brake.
Figure 9:
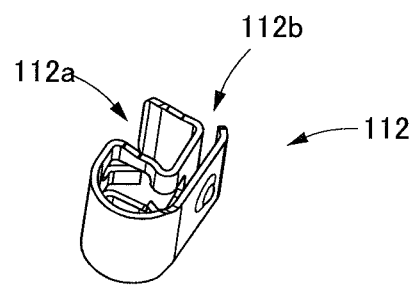
FIG. 9 is a perspective view of a circumferential spring mounted on another engageable protrusion.

As illustrated in FIGS. 2, 3, and 7, radial springs 110 illustrated in FIG. 8 are mounted respectively on the protrusions 90a, 92a of the respective first engageable protrusions 90, 92 and the second engageable protrusions 94, 96. Each of the radial springs 110 is one example of an elastic member. Circumferential springs 112 illustrated in FIG. 9 are mounted respectively on the protrusions 90b, 92b of the respective first engageable protrusions 90, 92. Each of the circumferential springs 112 is another example of the elastic member.

Each of the radial springs 110 includes: a fitting portion 110a formed by bending a plate member in a substantially three-sided rectangular shape; and a spring portion 110b overlapping a side surface of the fitting portion 110a with a space therebetween. The radial springs 110 are attached respectively to the protrusions 90a, 92a and the second engageable protrusions 94, 96 (hereinafter may be referred to as "the protrusion 90a and so on") in a state in which each of the protrusion 90a and so on is fitted in a corresponding one of the fitting portions 110a, and a corresponding one of the spring portions 110b is located on an inner side of each of the protrusion 90a and so on in the radial direction.

Each of the circumferential springs 112 includes: a fitting portion 112a formed by bending a plate member in a substantially three-sided rectangular shape; and a spring portion 112b overlapping a bottom surface of the fitting portion 112a with a space therebetween. The circumferential springs 112 are attached to the respective protrusions 90b, 92b in a state in which each of the protrusions 90b, 92b is fitted in a corresponding one of the fitting portions 112a, and a corresponding one of the spring portions 112b is located on an inner side of each of the protrusions 90b, 92b in the circumferential direction. It is noted that the corrosion potential of each of the radial springs 110 and the circumferential springs 112 is a middle amount between the corrosion potential of the frame 16 and the corrosion potential of the housing 10. For example, in the case where the housing 10 is formed of a material containing aluminum, and the frame 16 is formed of resin, the elastic member may be formed of a stainless material or a material containing nickel. Thus, when compared with a case where the frame 16 and the housing 10 are brought into direct sliding contact with each other, it is possible to reduce a potential difference between the sliding-contact members, resulting in reduced corrosion of the housing 10, for example.

The first engageable protrusions 90, 92 and so on formed on the frame 16 are engaged with the first engageable recessed portions 60, 62 formed on the main housing portion 20. The second engageable protrusions 94, 96 and so on are engaged with the second engageable recessed portions 64, 66. Specifically, as illustrated in FIG. 7, the protrusions 90a, 92a of the respective first engageable protrusions 90, 92 are engaged with the narrow portions 74 of the respective first engageable recessed portions 60, 62 via the respective radial springs 110, the protrusions 90b, 92b are engaged with the respective narrow portions 74 via the respective circumferential springs 112, and radially-outer surfaces 87a, 88a of the third side portion 87 and the fourth side portion 88 of the frame 16 are respectively in contact with portions of the wall surfaces 70 which correspond to the respective wide portions 76. Each of the spring portions 110b of the respective radial springs 110 is located between a corresponding one of the protrusions 90a, 92a and a corresponding one of wall surfaces 71 (see FIGS. 5 and 6) of the respective narrow portions 74. Each of the spring portions 112b of the respective circumferential springs 112 is located between a corresponding one of the protrusions 90b, 92b and the bottom surface 72. This configuration reduces positional misalignment of the frame 16 relative to the main housing portion 20 in the radial direction and the circumferential direction, resulting in reduced vibrations and abnormal sounds.

The second engageable protrusions 94, 96 and so on and the second engageable recessed portions 64, 66 are engaged in a similar manner. The second engageable protrusions 94, 96 are engaged with the narrow portions 74 of the respective second engageable recessed portions 64, 66 via the respective radial springs 110, and the radially-outer surfaces 87a, 88a of the third side portion 87 and the fourth side portion 88 are respectively in contact with the portions of the wall surfaces 70 which correspond to the respective wide portions 76.

Thus, in the present embodiment, a pair of engageable portions 100, 101 are constituted by including: portions of the frame 16 which include the pair of first engageable protrusions 90, 92 and the radially-outer surfaces 87a, 88a of the respective third side portion 87 and the fourth side portion 88; and the pair of first engageable recessed portions 60, 62 of the main housing portion 20. A pair of engageable portions 102, 103 are constituted by including: portions of the frame 16 which include the pair of second engageable protrusions 94, 96 and the radially-outer surfaces 87a, 88a of the respective third side portion 87 and the fourth side portion 88; and the pair of second engageable recessed portions 64, 66 of the main housing portion 20. In each of the engageable portions 100-103, each of the first engageable recessed portions 60, 62 and the second engageable recessed portions 64, 66 is a stepped grooved portion including the narrow portion 74 and the wide portion 76, each of the first engageable protrusions 90, 92 and the second engageable protrusions 94, 96 is engaged at a corresponding one of the narrow portions 74, and a structure in which each of the radially-outer surfaces 87a, 88a of the third side portion 87 and the fourth side portion 88 of the frame 16 contact a corresponding one of the wall surfaces 71 of the respective wide portions 76 is a labyrinth structure. Engagement between the frame 16 and the main housing portion 20 via the engageable portions 100-103 results in the frame 16 being held by the main housing portion 20 so as to be movable relative to each other in the axial direction.

In each of the engageable portions 100-103, even when the frame 16 is moved relative to the housing 10, each of circumferentially-inner surfaces 87b, 88b of the third side portion 87 and the fourth side portion 88 of the frame 16 is separated from the surfaces 78, 80 of the housing 10. Each of the circumferentially-inner surfaces 87b, 88b is a circumferentially-inner surface adjacent to a corresponding one of the radially-outer surfaces 87a, 88a.

Figure 10:
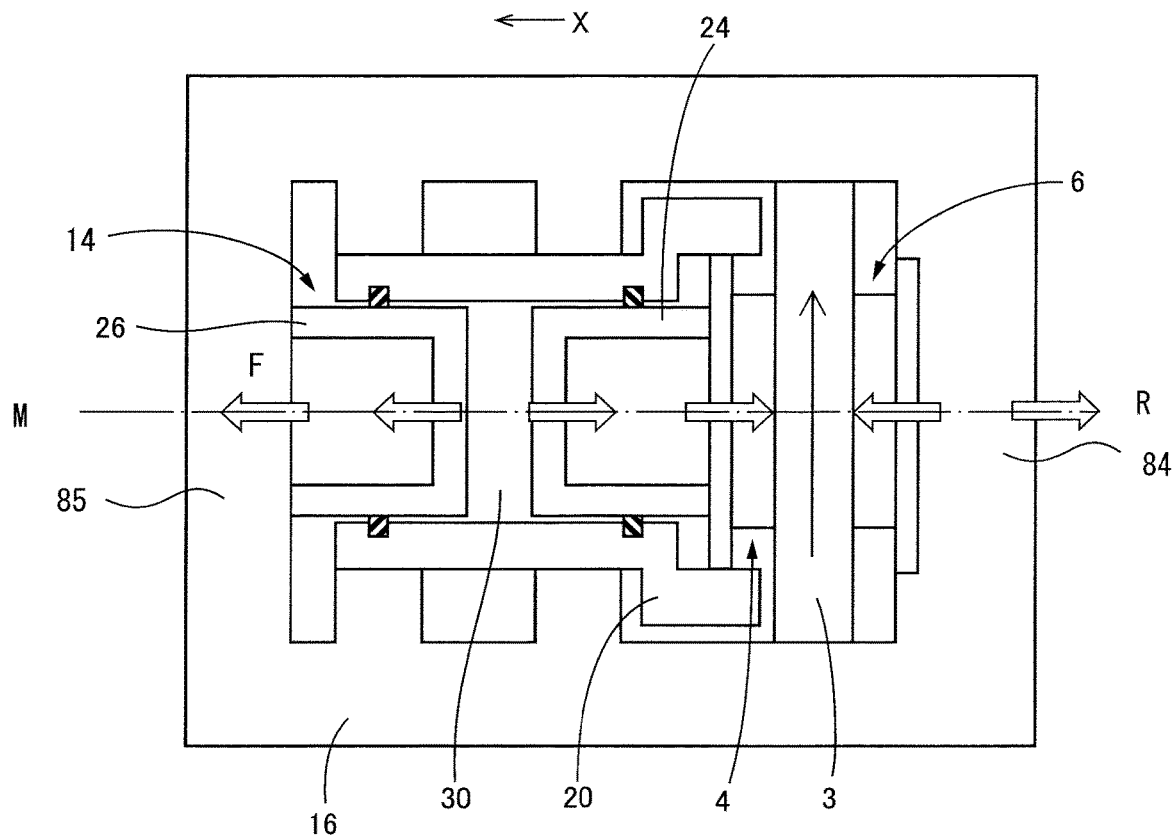
FIG. 10 is a view schematically illustrating operations of the disc brake.

As illustrated in FIG. 10, the disc brake 2 configured as described above is operated by a hydraulic pressure in the hydraulic-pressure chamber 30 defined in the wheel cylinder 14. A force F related to the hydraulic pressure in the hydraulic-pressure chamber 30 is applied to the first piston 24 and the second piston 26. The first piston 24 is moved toward the rotor 3 in the axial direction, thereby pressing the inner pad 4 against the rotor 3. The second piston 26 is moved in the direction indicated by the arrow X (i.e., the direction away from the rotor 3) in the axial direction, thereby moving the frame 16 in the direction indicated by the arrow X. The movement of the frame 16 in the direction indicated by the arrow X presses the outer pad 6 against the rotor 3. The rotor 3 is pressed by the inner pad 4 and the outer pad 6 from opposite sides of the rotor 3, whereby the rotor 3 and each of the inner pad 4 and the outer pad 6 are brought into frictional engagement with each other. As a result, the disc brake 2 is operated to reduce rotation of the wheel.

Figure 11:
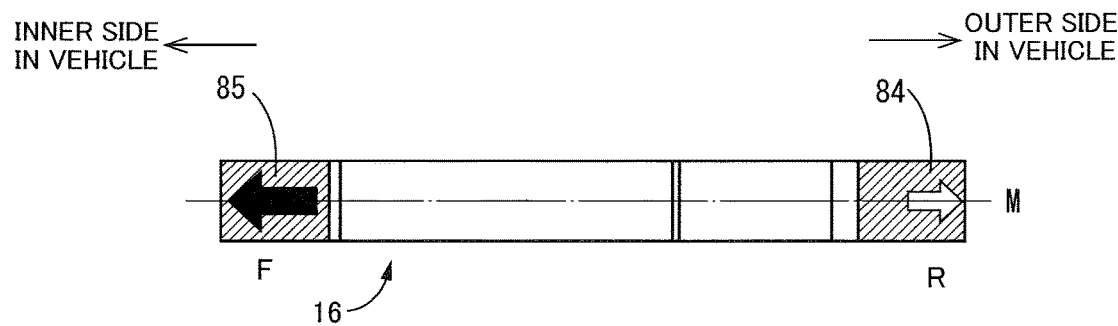
FIG. 11 is a view illustrating a state in which the disc brake is being operated.

The frame 16 receives a reaction force R related to the pressing force F applied from the outer pad 6 to the rotor 3. That is, the frame 16 receives the pressing force F and the reaction force R respectively directed in opposite directions. As illustrated in FIG. 11, the lines of application of the forces F, R are located on the same plane in the frame 16. This configuration reduces inclination of the frame 16 during operation of the disc brake 2, thereby reducing lowering of the pressing force due to the inclination of the frame 16.

As illustrated in FIG. 1, the disc brake 2 is mounted on the front portion or the rear portion of the rotor 3. This may lead to ingress of foreign matters, such as rainwater, into the engageable portions 101, 103 that are upper ones of the engageable portions 100-103. In the present embodiment, in contrast, each of the engageable portions 100-103 has a labyrinth structure, making it difficult for foreign matters such as water to enter into main portions of the engageable portions 101, 103, i.e., a region between each of the respective narrow portions 74 of the first engageable recessed portion 62 and the second engageable recessed portion 66 and a corresponding one of the first engageable protrusions 92 and the second engageable protrusion 96.

In each of the engageable portions 101, 103, the surfaces 78, 80 of the respective steps formed by the narrow portion 74 and the wide portion 76 are inclined such that a distance of each of the surfaces 78, 80 to the bottom surface 72 decreases with increase in distance of each of the surfaces 78, 80 from the inner pad 4 and the rotor 3. That is, the surfaces 78, 80 are inclined downward with decrease in distance to the inside of the vehicle. Thus, even in the event of ingress of foreign matters into the wide portions 76 of the respective engageable portions 101, 103, the foreign matters are easily discharged to the outside of the engageable portions 101, 103. This makes it more difficult for foreign matters to enter into the main portions of the engageable portions 101, 103. Also, foreign matters are easily discharged to an outer side that is an opposite side of each of the engageable portions 101, 103 from the rotor 3 and the inner pad 4. This well avoids ingress of the foreign matters into a region near sliding portions of the inner pad 4 and the rotor 3.

It is noted that the disc brake 2 is not limited to the hydraulic disc brake and may be an electromagnetic disc brake operable by an electromagnetic driving force. The effects of the present disclosure are achieved in the case where the disc brake 2 is not mounted on the front portion or the rear portion of the rotor 3 but mounted in a state in which the disc brake 2 is inclined with respect to the up and down direction of the rotor 3, in other words, in the case where the disc brake 2 is mounted at a position at which the rotor 3 and each of the inner pad 4 and the outer pad 6 are brought into frictional engagement with each other in a region in which an absolute value of the central angle with respect to the up and down direction of the rotor 3 falls within a range between 0 and 90 degrees.

It is not essential to provide the radial springs 110 and the circumferential springs 112 in the engageable portions 100-103. It is not essential that the first engageable protrusions 90 include the protrusions 90a, 90b, and the first engageable protrusions 92 include the protrusions 92a, 92b. While the embodiments and modifications have been described above, it is to be understood that the disclosure is not limited to the details of the illustrated embodiments and modifications, but may be embodied with various changes and modifications, which may occur to those skilled in the art, without departing from the spirit and scope of the disclosure.

Claimable Inventions (1) A disc brake of a floating type, comprising:
an inner pad and an outer pad respectively located on opposite sides of a rotor rotatable with a wheel;
a pressing device configured to press the inner pad and the outer pad against the rotor; and
a housing mounted on a non-rotating member and holding the pressing device, the inner pad, and the outer pad,
wherein the pressing device comprises:
a first pressing member movable toward the rotor;
a second pressing member movable away from the rotor; and
a frame held by the housing via at least one pair of engageable portions so as to be movable relative to the housing in a direction parallel with a rotation axis of the rotor, the pair of engageable portions being spaced apart from each other in a circumferential direction of the rotor, the frame being configured to be moved with movement of the second pressing member to press the outer pad against the rotor, and
wherein each of the at least one pair of engageable portions has a labyrinth structure.

A plurality of pairs of the engageable portions may be provided so as to be spaced apart from each other in the direction parallel with the rotation axis.

(2) The disc brake according to the above form (1),
wherein the at least one pair of engageable portions comprise:
at least one pair of engageable protrusions provided at one of the housing and the frame and spaced apart from each other in the circumferential direction; and
at least one pair of engageable recessed portions provided at the other of the housing and the frame and spaced apart from each other in the circumferential direction, and
wherein each of the at least one pair of engageable recessed portions comprises a bottom surface, a pair of wall surfaces, a narrow portion, and a wide portion, a distance between the pair of wall surfaces is greater in the wide portion than in the narrow portion, and the narrow portion and the wide portion form a stepped shape.

Each of the at least one pair of engageable recessed portions may be a stepped grooved portion extending in the direction parallel with the rotation axis of the rotor.

(3) The disc brake according to the above form (2), wherein a surface of a step between the narrow portion and the wide portion of each of the at least one pair of engageable recessed portions is an inclined surface inclined with respect to the rotation axis of the rotor.

The surface of the step is the inclined surface. Thus, even in the event of ingress of foreign matters, the foreign matters are easily discharged, making it more difficult for foreign matters to enter into the narrow portion.

(4) The disc brake according to the above form (3), wherein the inclined surface is inclined such that a distance of the inclined surface to the bottom surface decreases with increase in a distance of the inclined surface from the inner pad.

The inclined surface is inclined such that a distance of the inclined surface to the bottom surface decreases with decrease in distance of the inclined surface to the inside of the vehicle in the axial direction.

(5) The disc brake according to the above form (4),
wherein the disc brake is provided in an orientation in which the disc brake is inclined with respect to the up and down direction of the rotor,
wherein the at least one pair of engageable recessed portions are formed in the housing,
wherein the at least one pair of engageable protrusions are formed on the frame, and
wherein the inclined surface of an upper one of the at least one pair of engageable portions is inclined downward with increase in distance of the inclined surface from the inner pad.

Since the inclined surface is inclined so as to be lower at its portion far from the inner pad, the rotor, and so on than at its portion near the inner pad, the rotor, and so on, it is difficult for foreign matters, such as rainwater, discharged along the inclined surface to be supplied to a region near the rotor. Examples of the orientation in which the disc brake is inclined with respect to the up and down direction of the rotor include: an orientation in which the inner pad and the outer pad are brought into frictional engagement with the rotor in a region in which an absolute value of the central angle with respect to a line extending in the up and down direction of the rotor is greater than 0 degrees and less than equal to 100 degrees; an orientation in which an absolute value of the central angle between the line extending in the up and down direction and a line extending through the axis M of the pressing device and the rotation center of the rotor is greater than 0 degrees and less than equal to 100 degrees; and an orientation in which an obliquely upper portion and a side portion (e.g., a front portion or a rear portion) of the rotor are brought into frictional engagement with the inner pad and the outer pad.

(6) The disc brake according to any one of the above forms (2) through (5), wherein in each of the at least one pair of engageable portions, a corresponding one of the at least one pair of engageable protrusions is fitted in the narrow portion of a corresponding one of the at least one pair of engageable recessed portions, and a main body of the frame contacts at least one of portions of the pair of wall surfaces which portions correspond to the wide portion.

The engageable portion includes; the engageable recessed portion formed in the housing; the engageable protrusion formed on the main body of the frame; and a portion of the main body of the frame which contacts at least one of wall surfaces of the wide portion. The main body of the frame is constituted by the first side portion 84, the second side portion 85, the third side portion 87, and the fourth side portion 88. The frame is constituted by the main body of the frame and the engageable protrusion. The portion of the main body of the frame which contacts at least one of wall surfaces of the wide portion corresponds to the radially-outer surfaces 87a, 88a of the third side portion 87 and the fourth side portion 88 in the above-described embodiment.

(7) The disc brake according to any one of the above forms (1) through (6), wherein the frame has a substantially frame shape and comprises:
a second side portion opposed to the second pressing member;
a first side portion engaged with the outer pad so as to be movable together with the outer pad in the direction parallel with the rotation axis of the rotor;
a third side portion and a fourth side portion configured to couple the first side portion and the second side portion to each other and spaced apart from each other in the circumferential direction.

(8) The disc brake according to any one of the above forms (2) through (7),
wherein an elastic member is fitted on each of engageable protrusions of the at least one pair of engageable protrusions, and
wherein each of the at least one pair of engageable protrusions is fitted in a corresponding one of the at least one pair of engageable recessed portions via the elastic member.

Examples of the elastic member include: a radial spring configured to apply an elastic force in a radial direction; and a circumferential spring configured to apply an elastic force in the circumferential direction.

(9) The disc brake according to the above form (8), wherein a corrosion potential of the elastic member is a middle amount between a corrosion potential of the frame and a corrosion potential of the housing.

For example, in the case where the housing is formed of a material containing aluminum, and the frame is formed of resin, the elastic member may be formed of a stainless material or a material containing nickel.

(10) A disc brake of a floating type, comprising:
an inner pad and an outer pad respectively located on opposite sides of a rotor rotatable with a wheel;
a pressing device configured to press the inner pad and the outer pad against the rotor; and
a housing mounted on a non-rotating member and holding the pressing device, the inner pad, and the outer pad,
wherein the pressing device comprises:
a first pressing member movable toward the rotor;
a second pressing member movable away from the rotor; and
a frame held by the housing via at least one pair of engageable portions so as to be movable relative to the housing in a direction parallel with a rotation axis of the rotor, the pair of engageable portions being spaced apart from each other in a circumferential direction of the rotor, the frame being configured to be moved with movement of the second pressing member to press the outer pad against the rotor,
wherein the at least one pair of engageable portions comprise:
at least one pair of engageable protrusions provided at one of the housing and the frame and spaced apart from each other in the circumferential direction; and
at least one pair of engageable recessed portions provided at the other of the housing and the frame and spaced apart from each other in the circumferential direction, and
wherein each of the at least one pair of engageable recessed portions comprises a bottom surface, a pair of wall surfaces, a narrow portion, and a wide portion, a distance between the pair of wall surfaces is greater in the wide portion than in the narrow portion, and the narrow portion and the wide portion form a stepped shape.

The technical features according to any one of the above forms (1) through (9) may be incorporated into the disc brake according to the present form.

What is claimed is:

1. A disc brake of a floating type, comprising:
an inner pad and an outer pad respectively located on opposite sides of a rotor rotatable with a wheel;
a pressing device configured to press the inner pad and the outer pad against the rotor; and
a housing mounted on a non-rotating member and holding the pressing device,
wherein the pressing device comprises:
  a first pressing member movable toward the rotor;
  a second pressing member movable away from the rotor; and
  a frame held by the housing via at least one pair of engageable portions so as to be movable relative to the housing in a direction parallel with a rotation axis of the rotor, the pair of engageable portions being spaced apart from each other in a circumferential direction of the rotor, the frame being configured to be moved with movement of the second pressing member to press the outer pad against the rotor,
wherein each of the at least one pair of engageable portions has a labyrinth structure, and
wherein the at least one pair of engageable portions comprise:
  at least one pair of engageable protrusions provided at one of the housing and the frame and spaced apart from each other in the circumferential direction; and
  at least one pair of engageable recessed portions provided at the other of the housing and the frame and spaced apart from each other in the circumferential direction, and
  wherein each of the at least one pair of engageable recessed portions comprises a bottom surface, a pair of wall surfaces, a narrow portion, and a wide portion, and the narrow portion and the wide portion form a stepped shape.

2. The disc brake according to claim 1, wherein a surface of a step between the narrow portion and the wide portion of each of the at least one pair of engageable recessed portions is an inclined surface inclined with respect to the rotation axis of the rotor.

3. The disc brake according to claim 2, wherein the inclined surface is inclined such that a distance of the inclined surface to the bottom surface decreases with increase in a distance of the inclined surface from the inner pad.

4. The disc brake according to claim 1, wherein in each of the at least one pair of engageable portions, a corresponding one of the at least one pair of engageable protrusions is fitted in the narrow portion of a corresponding one of the at least one pair of engageable recessed portions, and a main body of the frame contacts at least one of portions of the pair of wall surfaces which portions correspond to the wide portion.

5. A disc brake of a floating type, comprising:
an inner pad and an outer pad respectively located on opposite sides of a rotor rotatable with a wheel;
a pressing device configured to press the inner pad and the outer pad against the rotor; and
a housing mounted on a non-rotating member and holding the pressing device,
wherein the pressing device comprises:
  a first pressing member movable toward the rotor;
  a second pressing member movable away from the rotor; and
  a frame held by the housing via at least one pair of engageable portions so as to be movable relative to the housing in a direction parallel with a rotation axis of the rotor, the pair of engageable portions being spaced apart from each other in a circumferential direction of the rotor, the frame being configured to be moved with movement of the second pressing member to press the outer pad against the rotor,
wherein the at least one pair of engageable portions comprise:
  at least one pair of engageable protrusions provided at one of the housing and the frame and spaced apart from each other in the circumferential direction; and
  at least one pair of engageable recessed portions provided at the other of the housing and the frame and spaced apart from each other in the circumferential direction, and
wherein each of the at least one pair of engageable recessed portions comprises a bottom surface, a pair of wall surfaces, a narrow portion, and a wide portion, a distance between the pair of wall surfaces is greater in the wide portion than in the narrow portion, and the narrow portion and the wide portion form a stepped shape.

* * * * *